Sept. 5, 1961          A. DEKKER          2,999,032
PROCESS FOR THE PREPARATION OF AMYLOSE SOLUTIONS
Filed Jan. 27, 1959          2 Sheets-Sheet 1
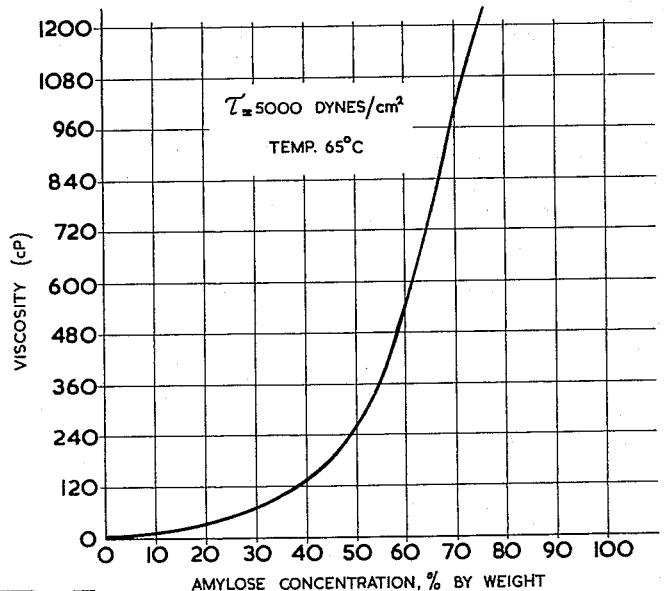
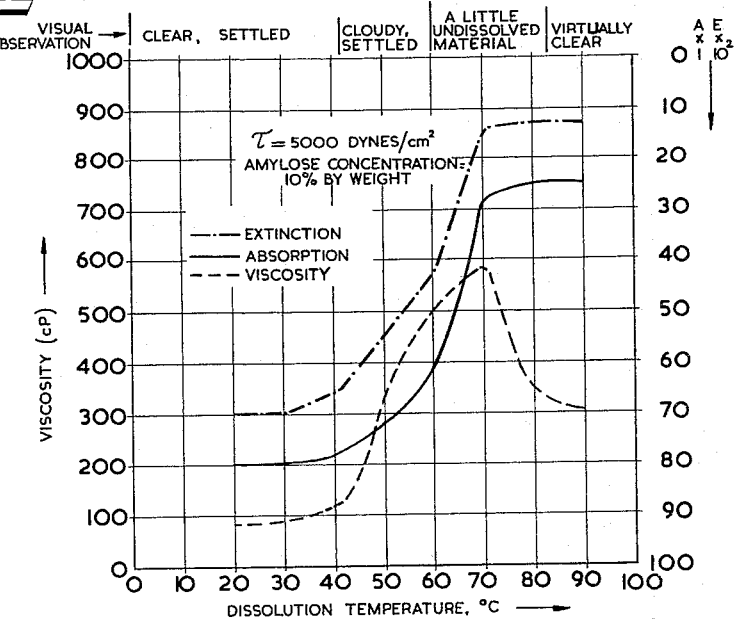
INVENTOR.
ADRIAAN DEKKER Sept. 5, 1961            A. DEKKER            2,999,032
PROCESS FOR THE PREPARATION OF AMYLOSE SOLUTIONS
Filed Jan. 27, 1959            2 Sheets-Sheet 2
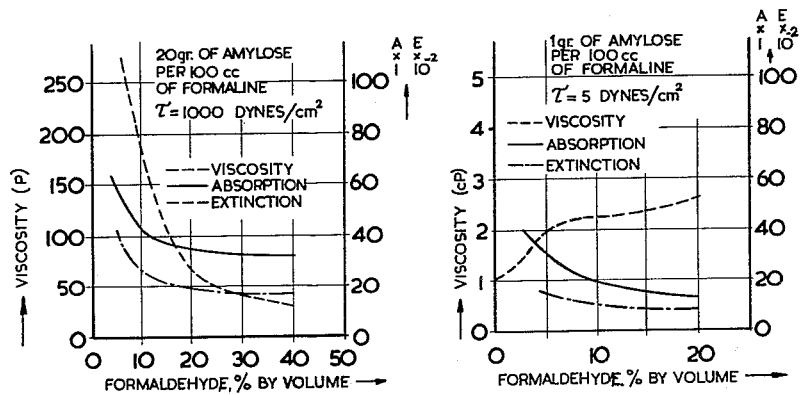
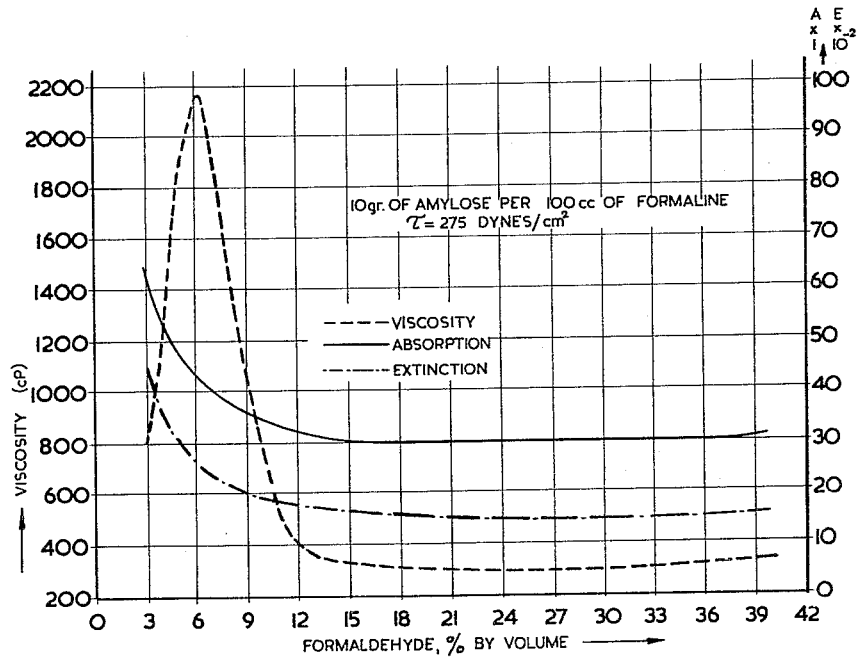
INVENTOR.
ADRIAAN DEKKER
BY Toulmin & Toulmin
ATTORNEYS

2,999,032
PROCESS FOR THE PREPARATION OF AMYLOSE SOLUTIONS

Adriaan Dekker, Deventer, Netherlands, assignor to Vasco Industries Corporation, New York, N.Y., a corporation of New York
Filed Jan. 27, 1959, Ser. No. 789,290
Claims priority, application Netherlands Jan. 29, 1958
8 Claims. (Cl. 106—213)

It is known from the U.S. Patents Nos. 2,608,723 and 2,656,571 that amylose can be dissolved in aqueous solutions of low alkanols by heating. The Dutch patent application No. 186,969, published on November 15, 1956, discloses a process for dissolving amylose, in which an aqueous suspension of amylose is heated for a short time at a temperature exceeding 120° C. and the solution thus obtained is rapidly cooled to a temperature not exceeding 100° C.

It was now surprisingly found that amylose solutions can be prepared by dissolving amylose, if desired mixed with amylopectin, in at least 6% by weight aqueous solutions of one or more compounds chosen from the group consisting of formaldehyde, formaldehyde-producing substances, glyoxal and glyoxal-producing substances.

In this way extremely concentrated amylose solutions can be prepared. In practice, the upper concentration limit of the amylose is only determined by the viscosity of the solution and the duration of the dissolving. At concentrations exceeding about 50% the viscosity rapidly increases and reaches extremely high values. However, also the highly concentrated solutions remain clear. The duration of dissolving, too, rapidly increases with rising concentrations.

As formaldehyde- and glyoxal-producing substances may be mentioned paraformaldehyde, trioxane and polyglyoxal. Mixtures of two or more of the above mentioned aldehydes and aldehyde-producing substances may also be used.

The maximum concentration of the aldehyde present in the solution is exclusively determined by the solubility thereof.

A further advantage of the process according to the invention is that it is not necessary to work at temperatures exceeding the boiling-point, so that a superatmospheric pressure need not be applied. A 10% solution of amylose can already be obtained at about 70–75° C. within 15 minutes. However, also at room temperature already a certain amount of dissolving occurs, which appears from the light absorption. For practical purposes the rate of dissolving at room temperature is of course much too slow, so that higher temperatures, especially above 70° C. are preferred.

As already stated, the duration of dissolving is greatly dependent on the amylose concentration and the temperature. As a matter of fact, the dissolving is promoted by stirring. The speed of stirring is not of importance, but may not approach nil, of course.

The solutions obtained according to the invention are very stable; i.e., they remain clear, even when stored for several months.

The resulting solutions can be used for all the desired purposes. For example, they can be moulded or extruded to form clear films and they can also be spun into a bath of a suitable composition to form films or filaments. Further, the solutions are especially suitable for carrying out chemical reactions with amylose. If desired, the resulting films may be treated with ammonia to remove formaldehyde present, if any.

Because it is not always simple to establish visually whether the amylose has dissolved entirely, a colorimeter and a Drage viscosity meter were used in the examples given hereinafter to establish whether a dispersion or a gel, or a solution was present. A solution absorbs considerably less light and is in general less viscous than a dispersion or gel. The change in light absorption and viscosity is sufficiently sharp to distinguish clearly between dispersion or gel on the one hand and solution on the other hand.

The following examples together with the figures illustrate the invention without, however, restricting it thereto.

FIGURE 1 is a graph of the viscosity of the solutions of the invention versus their concentration.

FIGURES 2a, 2b and 2c are graphs showing the influence of the formaldehyde concentration on the dissolution of the amylose.

FIGURE 3 is a graph showing the influence of the temperature on the dissolution of the amylose in a given time.

Example I

A commercial formalin containing 36% by weight of formaldehyde is charged into a round-bottomed flask, equipped with stirrer and reflux condenser. Subsequently, with stirring, 25 g. of amylose for each 100 ml. of formaldehyde solution are added. The used amylose had—as appeared from analysis—a purity of at least 97.5%. Therefore, it can be fairly said that this 25 g. consisted essentially of amylose. Then, with continuous stirring, the mixture is heated on an oil bath. After 10–15 minutes a clear yellowish-brown solution is obtained which, also after cooling and prolonged storing, remains clear.

In entirely the same manner solutions were prepared of mixtures of amylose and amylopectin in the weight ratios 70:30, 50:50 and 30:70, invariably using 25 g. of the mixture per 100 ml. of formaldehyde solution. Here, dissolving took place even somewhat quicker than with amylose alone.

Example II

It was tried to establish the upper concentration limit of amylose in 36% by weight formaldehyde solution. The same apparatus was used as in Example I; this time, however, the flask was also equipped with a thermometer. In the same manner as described in Example I a 30% solution of amylose in the formaldehyde solution was prepared at 95° C. The duration of dissolving was about 30 minutes. Subsequently the amylose concentration was increased by increments of 5%, maintaining the above temperature and the same speed of stirring. The duration of dissolving of each increment of amylose varied from 30 to 60 minutes. In this manner stable, clear solutions were obtained having concentrations up to 75% amylose. A further increase of the concentration in this manner was not very well possible owing to the extremely high viscosity. Instead of this a slow and careful evaporation on a water bath of solutions having amylose concentrations of from 70–75% was carried out. The solutions which became more and more concentrated did not turn cloudy at all. Ultimately, nearly dry, thick, clear films were obtained.

The diagram of FIGURE 1 represents the viscosity of the solutions plotted along the ordinate versus the concentration plotted on the abscissa. The viscosity was determined at 65° C. and a shearing stress of 5000 dynes/cm$^2$.

Example III

For various amylose concentrations the minimum formaldehyde concentration was determined at which dissolving occured. This was carried out by determining the viscosity and the light absorption and extinction. The results are represented in the diagrams of FIGURES 2a, 2b and 2c where the three above mentioned properties are plotted along the ordinate and the formaldehyde concentration along the abscissa. The amylose concentrations amounted to 20, 1 and 10% by weight resp. Dissolving always took place at 100° C. As appears from these diagrams, the minimum concentration of the formaldehyde is from 6 to 10% by volume.

*Example IV*

In this example the influence of the dissolution temperature was determined, the time and concentration factors being constant. It was investigated in how far 10 g. of amylose/100 ml. 40% by volume formaldehyde solution dissolved at various temperatures in the course of 15 minutes. The results appear from the diagram of FIGURE 3, in which the visual observation is also represented in addition to viscosity, absorption and extinction. Of course the conclusion may not be drawn from this diagram that amylose would not dissolve in the formaldehyde solution at temperatures below 70° C. In fact, in other experiments, it was established by measurement of the light absorption that after prolonged storage at room temperature some dissolution indeed occurs. Here the total duration of dissolving presumably lies in the order of magnitude of some hundreds of hours.

*Example V*

Two comparative experiments were carried out in each of which a 25% amylose solution in a 36% by weight formaldehyde solution was prepared under equal conditions, but the first with rapid stirring and the second while stirring slowly. No difference was established in the rate of dissolving, while the course of the viscosity and the light absorption was identical.

*Example VI*

This example shows that the best results of the invention are obtained when dissolving is carried out by heating at temperatures not over 100° C. at atmospheric pressure. Two experiments were carried out using 25 g. of amylose, 15 g. of 36% by weight formaldehyde solution and 60 g. of water (calculated on the dry amylose). In the first experiment these substances were brought in an autoclave and the latter was heated in an oil bath. After heating for 10 minutes at a pressure of 6 atm. the solution was taken out of the autoclave. In the second experiment the dissolution was carried out as in Example II. Both solutions had an amylose content of 25% by weight and a formaldehyde content of about 7.2% by weight. Their viscosities determined in the Drage viscosimeter and a shearing stress of 15,000 dynes/cm.$^2$ were 120 poises and 880 poises respectively. This shows that in the second experiment much less chain degradation of the amylose took place than in the first experiment.

*Example VII*

Entirely in the manner as described in Example I 25% solutions of amylose and of mixtures of amylose and amylopectin were prepared in aqueous solutions of glyoxal paraformaldehyde, trioxane and polyglyoxal. The results were completely analogous to those obtained with formaldehyde also the minimum concentration of the glyoxtal corresponds to that of formaldehyde.

It will be understood that the foregoing examples are for purposes of illustration only and that the invention is not restricted thereto.

It will be understood that the invention is susceptible to modification in order to adapt it to different usages and conditions and, accordingly, it is desired to comprehend such modifications within the invention as may fall within the scope of the appended claims.

I claim:

1. A process for preparing a solution of a member from the group consisting of: material consisting essentially of amylose, and mixtures of amylose and amylopectin, comprising the step of: dissolving said member at from room temperature up to 100° C. in an aqueous solution containing at least 6% by weight of a solute from the group consisting of: formaldehyde and glyoxal, whereby upon dissolution of said member, a clear, stable true solution is obtained.

2. The process of claim 1, wherein said member is a material consisting essentially of amylose.

3. The process of claim 1, wherein the said solute is formaldehyde.

4. The process of claim 1, wherein said member is a material consisting essentially of amylose, and said solute is formaldehyde.

5. Process according to claim 3, wherein the dissolution is carried out at temperatures of from 70° to 100° C.

6. Process according to claim 4, wherein the dissolution is carried out at temperatures of from 70° to 100° C.

7. Process according to claim 3, wherein the solution is afterwards subjected to a treatment to remove the water therefrom, thereby yielding shaped objects.

8. Process according to claim 4, wherein the solution is afterwards subjected to a treatment to remove the water therefrom, thereby yielding shaped objects.

References Cited in the file of this patent

UNITED STATES PATENTS

| | | |
|---|---|---|
| 2,099,765 | Horst et al. | Nov. 23, 1937 |
| 2,414,858 | Davidson | Jan. 28, 1947 |
| 2,583,286 | Albini-Colombo | Jan. 22, 1952 |
| 2,585,407 | Rives | Feb. 12, 1952 |
| 2,801,184 | Miyamoto | July 30, 1957 |
| 2,867,615 | Lehmann et al. | Jan. 6, 1959 |
| 2,902,336 | Hiemstra et al. | Sept. 1, 1959 |

FOREIGN PATENTS

| | | |
|---|---|---|
| 772,479 | Great Britain | Apr. 17, 1957 |